US012151398B2

(12) United States Patent
Janković

(10) Patent No.: US 12,151,398 B2
(45) Date of Patent: Nov. 26, 2024

(54) MOULD FOR THIN SAMPLE CASTING

(71) Applicant: Dragana Janković, Sarajevo (BA)

(72) Inventor: Dragana Janković, Sarajevo (BA)

(73) Assignee: Dragana Jankovic, Sarajevo (BA)

( * ) Notice: Subject to any disclaimer, the term of this patent is extended or adjusted under 35 U.S.C. 154(b) by 357 days.

(21) Appl. No.: 17/300,786

(22) Filed: Nov. 10, 2021

(65) Prior Publication Data

US 2022/0379519 A1 Dec. 1, 2022

(51) Int. Cl.
*B28B 7/00* (2006.01)
*B28B 7/18* (2006.01)

(52) U.S. Cl.
CPC .............. *B28B 7/0094* (2013.01); *B28B 7/18* (2013.01)

(58) Field of Classification Search
CPC ............ B28B 7/0094; B28B 7/02; B28B 7/18
See application file for complete search history.

(56) References Cited

FOREIGN PATENT DOCUMENTS

| | | | | |
|---|---|---|---|---|
| CN | 208705130 U * | 4/2019 | ............... | G01N 1/28 |
| EP | 1321257 A2 * | 6/2003 | ............. | B28B 1/008 |

* cited by examiner

*Primary Examiner* — James Sanders

(57) ABSTRACT

Mould for casting of thin samples made of cement-based materials, for a maximum of 10 small samples (10×10×2 mm or ⅜x⅜x1⁄16 inch), consists of a solid stainless steel base plate, stainless steel upper frame-plates and thin plastic foil. The stainless steel frame plates of various lengths are assembled on the base plate and fastened with screws to form a frame with 10 free spaces ('cells') into which the concrete/cementitious material is poured. The thickness (2 mm or 1⁄16 inch) of the thin frame plates determines the thickness of the cast samples. Plastic transparent foil is placed over the surface of the base plate for easier sample removal. The advantages of the mould are: possibility of assembling and disassembling of all mould parts and hence safe sample removal after 24 hours, multiple usage as well as easy maintenance and cleaning.

6 Claims, 2 Drawing Sheets

FIG. 1
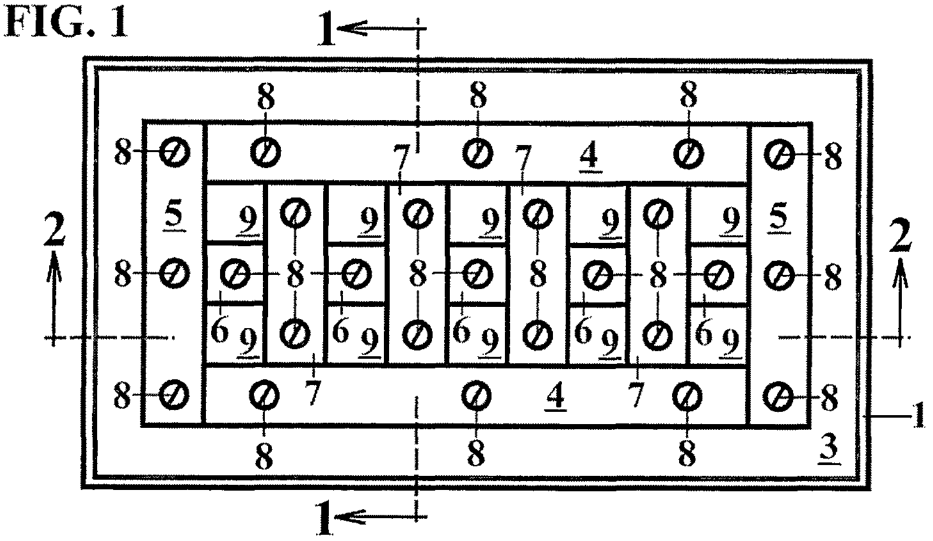
1-1
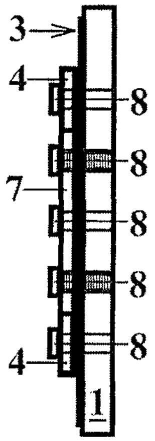
FIG. 2
FIG. 3
2-2
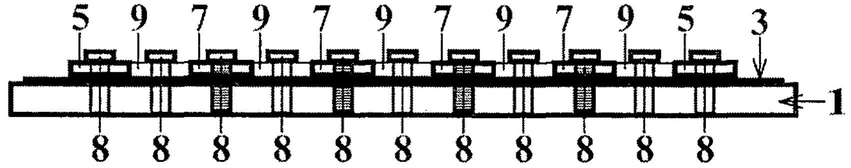
FIG. 4
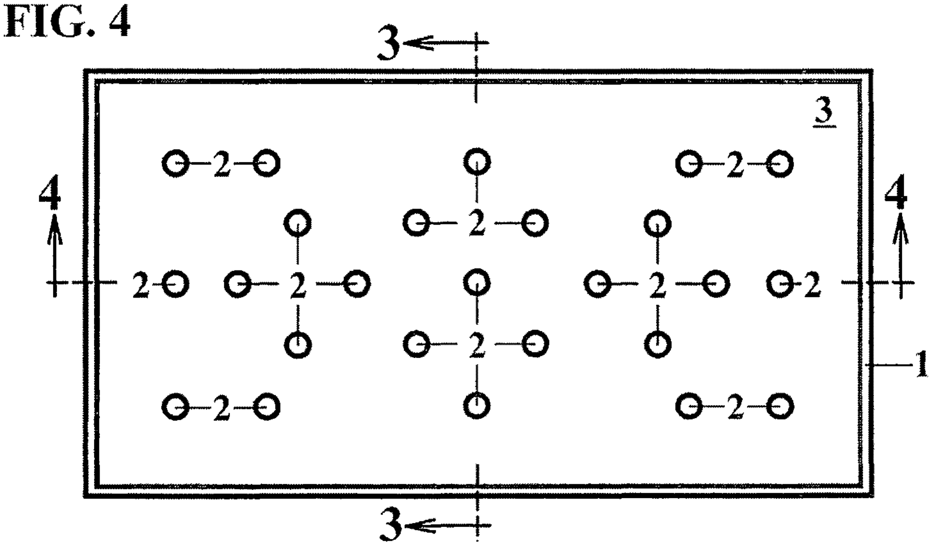
3-3
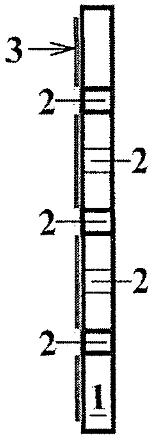
FIG. 5
FIG. 6
4-4
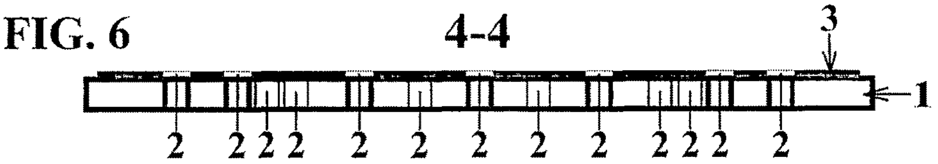

2 plates 5-5

2 plates 6-6

4 plates 8-8

5 plates 7-7

MOULD FOR THIN SAMPLE CASTING

BACKGROUND OF THE INVENTION

To extend the life of our concrete structures, various experiments on behaviuor of cementitious materials are performed at lower scales (meso- and micro-scale) in Environmental Scanning Electron Microscope, ESEM. These experiments differ in their kind, way they are performed, size of samples and their preparation, investigated parameters, etc.

One of the experiments is the nondestructive examination of drying shrinkage and microcracking behaviour of cement-based samples. In order to avoid the development of a moisture gradient across sample thickness and to enable sample uniform drying under reduced humidity conditions in ESEM chamber, the thickness of samples for such test should be very thin, about 1 mm (1/32 inch). In the case of experiments on drying shrinkage and cracking of cement-based samples in the ESEM by other researchers (ref. Neubauer and Jennings, 2000), samples were cast in large moulds and fractured in smaller flakes with a hammer. The age of these samples was minimum 7 days, thus already hardened. The size of these flakes differed. However, this destructive way of the preparation of cement-based samples by breaking larger sample into smaller flakes, disturbs their microstructure and could not give reliable results on drying shrinkage and microcracking behavior.

Since no appropriate casting mould existed for such small samples, the challenge in sample preparation for such experiments, appeared when cement-based samples are examined at their early age (minimum 2-3 days old and above). First half-successful trials in sample preparation by the current inventor* (MSc. Dragana Jankovié) of the mould for thin sample casting, included cutting of large prismatic samples size 40×40×160 mm (12/8×12/8×6 inch) into 30×30×2 mm (9/8×9/8×1/16 inch) slices, when they were about 7 days old. The problem of sample preparation was not solved since it was not possible to cut thin samples made of cementitious material at younger age (2-3 days old) due to their extreme breakability, which makes any handling and testing impossible.

Thus, the invention of mould for thin sample casting proved to be a necessity when it comes to samples for drying shrinkage and microcracking experiments in young (2-3 days old) cement-based samples in ESEM (Environmental Scanning Electron Microscope). The current inventor* developed the so-called mini-mould for casting of a sample size 30×30×2 mm (9/8×9/8×1/16 inch), which was used as the initial idea in developing the current mould for 10 samples. No other previous inventions of thin sample mould were known to the inventor* of the current invention.

*Inventor: MSc Dragana Jankovié, Structural Civil Engineer, UCF, FL

REFERENCE

Neubauer, C. M. and Jennings H. M. *The use of digital images to determine deformation throughout a microstructure . Part II. Application to cement paste, Journal of Materials Science*, Vol. 35 (2000), pp. 5751-5765.

BRIEF SUMMARY OF INVENTION

In order to investigate drying shrinkage and microcracking in the electron microscope (ESEM), in thin cement-based samples at their early age (min 2-3 days old), when samples are still soft and breakable, a stainless steel mould is designed for their casting. It consists of a solid rectangular base (bottom) plate and thin separate plates, which are symetrically assembled in a frame to create empty space ('cells') for sample casting. The frame (plates) are fastened to the base plate with screws. The thickness of the plates 2 mm (1/16 inch) determines the thickness of cast samples. For the easier sample removal, the samples are cast on plastic foil that is placed at the surface of the base plate, under the frame. Since a larger number of thin 10×10×2 mm (3/8×3/8×1/16 inch) samples is needed for numeruos tests in ESEM, the mould is designed with 10 cells. If needed, the shape and size of cast samples can vary by removing a certain number of inner plates before casting. The mould is multipurpose, easy to handle and maintain.

BRIEF DESCRIPTION OF DRAWINGS

FIG. 1. Upper (plan) view of an assembled mould with rectangular base plate covered with foil, and mounted rectangularly shaped thin-frame that forms 10 empty spaces ('cells') for sample casting, all fastened with screws.

FIG. 2. Cross section (1-1) of an assembled mould, through a rectangular middle frame plates and screws.

FIG. 3. Cross section (2-2) of the assembled mould, through empty square 'cells,' middle frame plates and screws.

FIG. 4. Upper (plan) view of a surface of base plate covered with foil and visible screw holes on both surfaces.

FIG. 5. Cross section (3-3) of the middle of base plate with foil, along the shorter axis, with visible and marked screw holes throughout the plate and foil thickness.

FIG. 6. Cross section (4-4) of the middle of base plate with foil, along the longer axis, with visible screw holes throughout the plate and foil thickness.

DETAILED DESCRIPTION OF INVENTION

The multipurpose stainless-steel mould, with a possibility of assembling and disassembling, is created for casting a maximum of 10 thin cement-based samples size 10×10×2 mm (3/8×3/8×1/16 inch).

The mould (fully assembled in FIG. 1-3) consists of a solid stainless-steel plate 1, size 130×70×5 mm (13 3/8×7 3/8×

Figure 7:
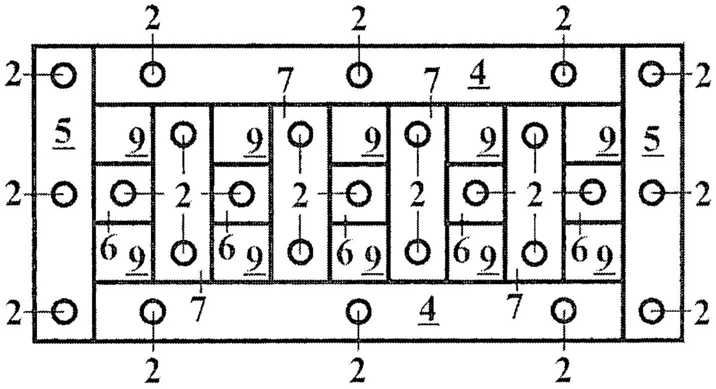
FIG. 7. Upper (plan) view of the horizontally and vertically symmetrical rectangular frame, made of thin plates of various lengths with screw-hole positions.
Figure 8:
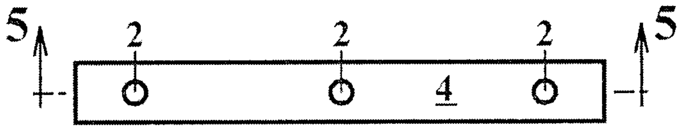
FIG. 8. Upper (plan) view of the longest external rectangular frame-plate(s) located at the upper and lower frame side as in FIG. 7, with visible screw-hole positions.
Figure 9:
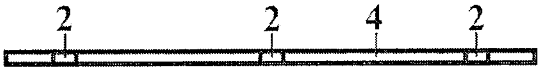
FIG. 9. Horizontal cross section (5-5) of the longest external rectangular frame-plate(s), through (visible) screw-hole spacings.
Figure 10:
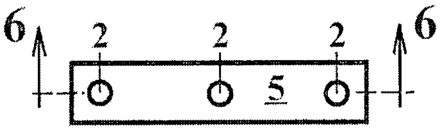
FIG. 10. Upper (plan) view of the external rectangular frame-plate(s), located at the far left and far right side of the frame as in FIG. 7, with screw-hole positions.
Figure 11:
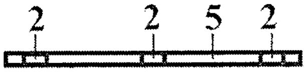
FIG. 11. Horizontal cross section of the external rectangular frame-plate(s) (6-6), through screw-hole spacings.
Figure 12:
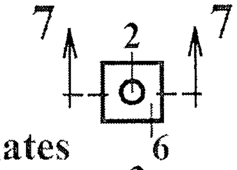
FIG. 12. Upper (plan) view of the inner square frame-plate(s), located in the middle of the frame as in FIG. 7, with screw-hole position.
Figure 13:
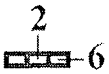
FIG. 13. Horizontal cross section (7-7) of the square frame-plate(s), through screw-hole spacing.

3/16 inch), FIG. 1-6, a very thin plastic foil 3 (visible on FIG. 1-6) thickness of about 0.1 mm (1/320 inch), approximate size 126×66 mm (1/2×6 3/8 inch), and the stainless-steel frame 110×50×2 mm (10 3/8×10 3/16×1/16 inch), FIG. 7. The frame consists of thin plates of different lengths: two external thin plates 4 size 90×10×2 mm (28/8×3/8×1/16 inch), FIG. 8-9, two external thin plates 5 size 50×10×2 (15/8×3/8×1/16 inch), FIG. 10-11; five inner thin plates 6, size 10×10×2 mm (3/8×3/8×1/16 inch), FIG. 12-13 and four inner thin plates 7, size 30×10×2 mm (9/8×3/8×1/16 inch), FIG. 14-15. All stainless steel parts are smoothly polished.

The solid rectangular plate 1 (drilled with screw holes 2) is used as the mould base, FIG. 1-6. In order to prevent sample damaging due to their sticking to the plate surface, the base plate surface is covered with a rectangular, thin, transparent, plastic but firm foil 3 of a similar area (FIG. 1-6) also with drilled screw holes 2 of identical size as in the base plate 1. Although the plate 1 surface as well as the whole mould is smoothly polished, the sample sticking to the mould surface is very common, since the samples are thin and very young at the time of their removal from the mould (after 24 hours of casting). The foil 3 has also a purpose of creating the extremely flat bottom of the samples for the experiments in ESEM chamber, where the samples are placed in the specially designed microscope cooling stage. The upper surface of the sample must also be an extremely smooth in order to obtain the clearest possible images on the electron microscope and their further analysis.

The rectangular frame is designed in such way to be disassembled into parts. The frame (FIG. 7) is mounted on top of the base plate 1 and foil 3 (FIG. 1). The frame consists of separate thin plates 4-7 (FIG. 7-15), to form a symmetrical structure, narrower than the base plate. The narrower frame size (FIG. 1), was chosen for practical reasons, i.e., to ensure easier and safer handling of the mould and samples. The frame is assembled in such a way to create 10 empty spaces ('cells') 9 of size 10×10×2 mm (3/8×3/8×1/16 inch) into which the cementitious materials are cast (FIG. 1-2).

Figure 14:
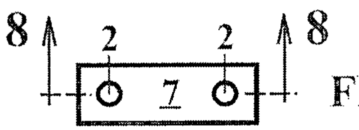
FIG. 14. Upper (plan) view of the inner rectangular frame-plate(s), located in the middle of the frame as in FIG. 7, with screw-hole positions.
Figure 15:
FIG. 15. Horizontal cross section (8-8) of the inner rectangular frame-plate(s), through screw-hole spacings.

The lengths of thin plates 4-7 are different. The two longest rectangular plates 4 are placed at the upper and lower frame side (FIG. 7-9), the two shorter rectangular plates 5 are placed at the far right-and left-hand side (FIGS. 7, 10-11), five square plates 6 are placed in the middle (FIGS. 7, 12-13) and four rectangular plates 7 are placed in the middle of the frame (FIGS. 7, 14-15). The advantage of frame that consists of loose plates 4-7 instead of being a one whole frame, is to safely remove the samples from the frame, by removing screws 8 and frame plates 4-7 one by one (FIG. 1-3). The design of frame gives the possibility to remove any of the inner, middle plates 6-7 in order to cast a sample of dimensions other than 10×10×2 mm (3/8×3/8×1/16 inch).

The screw holes 2 size ϕ3.1 mm (ϕ1/8 inch) in FIG. 4-15, are drilled throughout the thickness of the base plate 1, foil 3 and the frame plates 4-7, to fasten the plate 1 (FIG. 1-6), foil 3 (FIG. 1-6) and the frame (in FIG. 7) into the whole (FIG. 1-3) with identical screws 8 (FIG. 1-3). When mould is assembled (in FIG. 1-3), the total depth of the screw-holes 2 is 7 mm (2/8 inch). The 1 mm (1/32 inch) high heads of screws 8 are planned to stick out of the frame surface for easier screw removal.

The mould is developed in steps, every time adding or changing some of its parts in order to improve their function. It started from the development of the so-called mini-mould** of the same inventor*, for casting of one sample size 30×30×2 mm (9/8×9/8×1/16 inch).—The necessity for the specific ESEM experiment, contributed to the modifications of the frame for casting of smaller samples and subsequent enlargement of their numbers in a larger mould. During designing of the mould, mostly the thickness of the frame plates 4-7 was changed due to the design of the sample holder in ESEM chamber. It was reduced from 10 mm (6/16 inch) to 2 mm (1/16 inch) and even to 1 mm (1/32 inch). Although the recommended sample thickness by the literature (for the drying experiments) was 1 mm (1/32 inch), it was not possible to remove 1 mm (1/32 inch) thick samples after 24 hours from the mould, when the thickness of the frame plates 4-7 was only 1 mm (1/32 inch) without breaking them. Besides, it was necessary to polish their upper surface to be very smooth to create sharp images in ESEM. That is why the frame plate thickness was chosen to be 2 mm (1/16 inch). That allowed the safe sample removal from the mould as well as the possibility of perfect polishing later on by removing the sample surface layer of 1 mm (1/32 inch).

*Inventor: MSc Dragana Janković, Structural Civil Engineer, UFC, FL

**The inventor* was told that it was not necessary to apply mini-mould for the patent in US, since both moulds are similarly designed, with the same purpose.

The current mould design offers many possibilities. If samples of other dimensions need to be cast, that is possible by removing any of the inner frame plates 6-7 (FIGS. 7, 12-15), depending on the wanted sample size. Also, by changing a frame plate thickness, FIGS. 9, 11, 13, 15, from 2 mm (1/16 inch) to the thickness of 5 mm or 3/16 inch, it would be possible to cast thicker samples of various sizes for other type of experiments or from other material. The used material for mould should be firm and heavy, resistant to scratches and long lasting, with the possibilities to create extremely smooth surfaces of the whole mould. That is why the best material that fulfills all the necessities would be a stainless-steel. The usage of mould is as follows. After 24 hours from the time of sample casting in the assembled mould (FIG. 1-3), the cement-based samples are carefully removed from mould ('cells' 9, FIGS. 1-2, 7) by unscrewing the screws 8 (FIG. 1-3) and releasing the plates 4-7 (FIG. 7-15), one by one. In that way, samples are safely handled and the mould is disassembled. The samples are then carefully handled for further curing in the special climate chamber. The disassembled mould is then cleaned part by part with plain water, and dried with a soft, cotton cloth. The care is always taken to avoid any possible damage during cleaning. After every mould part is cleaned and dried, the mould is reassembled.

The invention claimed is:

1. A stainless-steel mould for a casting of 2 mm (1/16 inch) thick cement-based samples, comprising:

a stainless-steel solid base plate that is drilled with screw holes, and serves as a sample holder, a firm transparent plastic foil that is drilled with screw holes, and serves for easier sample removal, a set of screws, wherein the grid is composed of separate external and internal stainless-steel thin plates of a same thickness of 2 mm (1/16 inch), a same width of 10 mm (3/8 inch), and different lengths that vary from 10 mm (3/8 inch) to 90 mm (28/8 inch), wherein the thin plates are drilled with screw holes for attaching the thin plates to the solid base plate and the plastic foil by means of the screws to form 10 empty spaces (cells) measuring 10×10×2 mm (3/8×3/8 1/16 inch), wherein all thin plates can be fully detached from the solid base plate by removing all screws, wherein the stainless-steel mould retains its moulding function when the external thin plates are attached and at least some of the internal thin plates are detached from the solid base plate and the plastic foil to create empty spaces (cells) for the casting of various sized samples from 30×10×2 mm (9/8×3/8×1/16 inch) to 30×90×2 mm (9/8×28/8×1/16 inch).

2. The stainless-steel mould of claim 1, wherein the stainless-steel solid base plate is 130×70 mm (13 3/8×7 3/8 inch) wide and 5 mm (3/16 inch) thick and smoothly polished on all sides and drilled with the screw holes on the plate surface and through the entire plate thickness.

3. The stainless-steel mould of claim 1, wherein the firm transparent plastic foil is 0.1 mm (1/320 inch) thick and drilled with the screw holes on the plastic foil surface, wherein the plastic foil is placed over the solid base plate.

4. The stainless-steel mould of claim 1, wherein the stainless-steel external thin plates are rectangular and the stainless-steel internal thin plates are either rectangular or square, wherein they are all smoothly polished for easier handling, wherein the thin plates are drilled with the screw holes along a central axis and through their entire thickness.

5. The stainless-steel mould of claim 1, wherein the screw holes match in size and place when the thin plates, the thin plastic foil and the solid base plate are attached to each other.

6. The stainless-steel mould of claim 1, wherein the thickness of the stainless-steel thin plates can vary from 2 mm (1/16 in) depending on a desired thickness of the cement-based samples.

* * * * *